United States Patent
Yi

(10) Patent No.: US 7,391,941 B2
(45) Date of Patent: Jun. 24, 2008

(54) REDUCING AMPLITUDE ERRORS IN ARRAYED WAVEGUIDE GRATINGS

(75) Inventor: Xianmin Yi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 10/448,760

(22) Filed: May 30, 2003

(65) Prior Publication Data
US 2004/0240787 A1   Dec. 2, 2004

(51) Int. Cl.
*G02B 6/34* (2006.01)
*G02B 6/26* (2006.01)

(52) U.S. Cl. .............................. 385/37; 385/27; 385/50

(58) Field of Classification Search .................. 385/14, 385/24, 37, 50; 359/618, 634
See application file for complete search history.

(56) References Cited

U.S. PATENT DOCUMENTS

| | | | |
|---|---|---|---|
| 5,940,548 A * | 8/1999 | Yamada et al. ................. 385/14 |
| 6,023,544 A * | 2/2000 | Dragone ....................... 385/37 |
| 6,141,152 A * | 10/2000 | Trouchet ....................... 385/37 |
| 6,339,664 B1 | 1/2002 | Farjady et al. ................. 385/37 |
| 6,466,715 B1 * | 10/2002 | Akiba et al. ................... 385/37 |
| 6,665,466 B2 * | 12/2003 | Katayama ..................... 385/37 |
| 6,728,442 B2 * | 4/2004 | Missey et al. ................. 385/37 |
| 6,768,842 B2 * | 7/2004 | Bulthuis et al. ............... 385/37 |

OTHER PUBLICATIONS

Wang et al., Aberration Theory of Arrayed Waveguide Grating, Feb. 2001, Journal of Lightwave Technology, vol. 19, pp. 279-284.*

* cited by examiner

*Primary Examiner*—Hemang Sanghavi
*Assistant Examiner*—Omar Rojas
(74) *Attorney, Agent, or Firm*—Trop, Pruner & Hu, P.C.

(57) ABSTRACT

An arrayed waveguide grating with improved edge channel aberration may be achieved by tuning the arrayed waveguide grating to have a stigmatic point for the input and output waveguides that is not at the center of the Rowland circle. In this way, crosstalk, ripples, and transmission spectrum uniformity may be improved in some embodiments of the present invention.

14 Claims, 3 Drawing Sheets

REDUCING AMPLITUDE ERRORS IN ARRAYED WAVEGUIDE GRATINGS

BACKGROUND

This invention relates generally to optical communications and, particularly, to arrayed waveguide gratings. Arrayed waveguide gratings are also sometimes called waveguide grating routers or phased array waveguide gratings.

In wavelength division multiplexed optical signals, a plurality of different optical signals, each having a different wavelength, may be multiplexed over the same optical length. At intended destinations, one or more of the wavelength signals may be separated using a demultiplexing technique.

An arrayed waveguide grating works like a diffraction grating. It may be fabricated as a planar structure including input and output waveguides, input and output waveguide couplers, and arrayed waveguides. The length of any arrayed waveguide may differ from adjacent waveguides by constant $\Delta L$.

The input waveguide coupler splits the wavelength channels equally among the arrayed waveguides. Each portion of the input light traveling through the arrayed waveguide includes all the wavelengths that have entered the grating. Each wavelength in turn is individually phase shifted. As a result of that phase shift and phase shifts at the input/output waveguide couplers, every portion of the light at a given wavelength sees different phase shifts. These portions may interfere at the output waveguide coupler, producing a set of maximum light intensities. The direction of each maximum intensity depends on its wavelength. Thus, each wavelength is directed to an individual output waveguide.

Arrayed waveguide gratings should ideally have low insertion loss, low crosstalk, broad bandwidth, and a flat pass band. However, conventional arrayed waveguide gratings exhibit aberrations in the transmission spectra. Specifically, when the arrayed waveguide gratings are designed according to the standard Rowland mounting, the transmission spectra are symmetric only for the center channels and are increasingly asymmetric for the edge channels.

Conventionally it is believed that these aberrations are phase aberrations. Thus, efforts to correct these aberrations have focused on correcting the phase aberration.

Thus, there is a need for better ways to correct the aberration in arrayed waveguide gratings.

DETAILED DESCRIPTION

Figure 1:
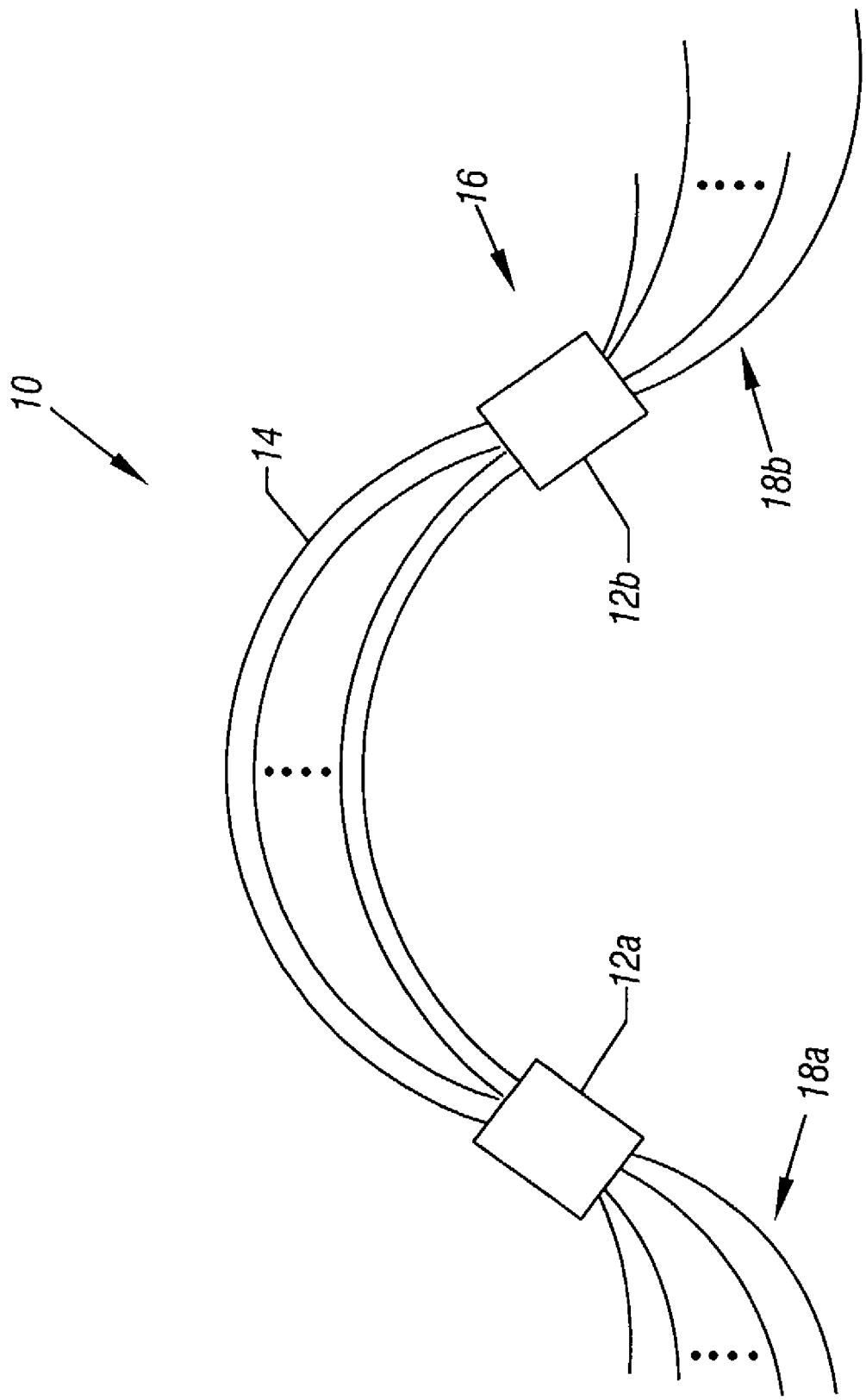
FIG. 1 is a schematic depiction of an arrayed waveguide grating in accordance with one embodiment of the present invention.

Referring to FIG. 1, an arrayed waveguide grating 16 may be formed on a planar lightwave circuit 10 in accordance with one embodiment of the present invention. The planar lightwave circuit 10 is an optical circuit that may be formed on a semiconductor substrate using techniques familiar to the processing of electronic integrated circuits.

A plurality of input waveguides 18a are coupled to an input waveguide coupler 12a. A plurality of output waveguides 18b are coupled to an output waveguide coupler 12b. The waveguide array 14, between the couplers 12a and 12b, may include a plurality of waveguide pairs. The difference in lengths of successive waveguide pairs may be $\Delta L$.

The input optical beam is spread horizontally as a result of the input waveguide coupler 12a. Light passes through the array of waveguides 14 to the output waveguide coupler 12b, which is a free propagation region. Various wavelengths are coupled to different output waveguides 18b due to the constructive and destructive interference in the array of waveguides 14.

Figure 2:
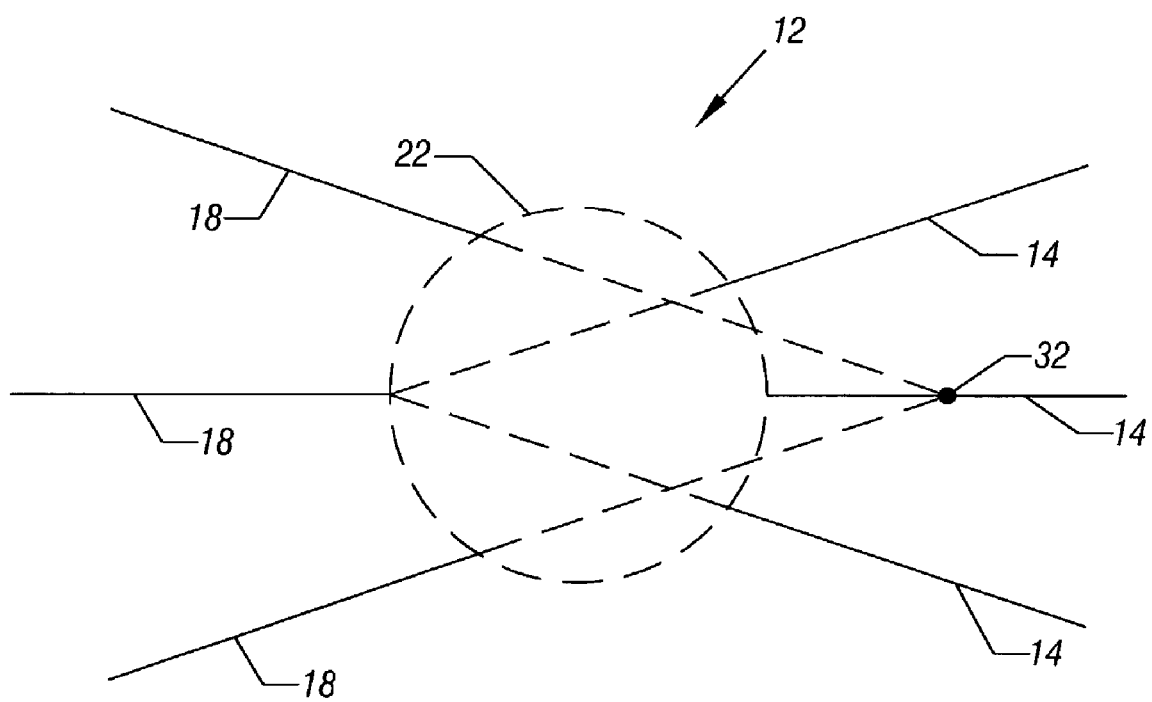
FIG. 2 is a hypothetical Rowland circle diagram for one embodiment of the present invention.

Referring to FIG. 2, a Rowland circle 22 may be utilized to design the couplers 12a and 12b. The Rowland circle 22 may have an edge that defines the locations of the ends of a plurality of waveguides 18, associated with the input waveguides 18a or the output waveguides 18b of FIG. 1. Conventionally, the waveguides 14 have their ends on the Rowland circle and their stigmatic point (i.e., focus point) on the opposite side of the Rowland circle centered on the center waveguide 18. In conventional practice, the input or output waveguides 18 have their stigmatic point centered at the center of the Rowland circle 22. However, as shown in FIG. 2, this is not the case in accordance with embodiments of the present invention.

The problem with existing techniques is that the transmission spectrum of the arrayed waveguide grating has one center input channel and a plurality of output channels. The pass band is generated, for example, using parabolic tapers at the end of the input waveguides. The center channels have symmetric pass bands, while the edge channels have asymmetric pass bands. This asymmetry translates directly into large pass band ripple at high adjacent channel crosstalk. As a result, the asymmetry also makes it difficult to reduce the insertion loss by tuning the tapers of the input and output waveguides. Conventionally this problem is addressed by attempting to correct phase aberration when, in fact, the aberration is actually due to amplitude aberration.

An arrayed waveguide grating based on standard Rowland mounting has one stigmatic point corresponding to the center output channel. The center channels have negligible phase aberrations, while the phase aberrations of the edge channels can be quite large. Therefore, it has been natural to associate the aberration in the transmission spectrum with the phase aberration of the arrayed waveguide grating. This turns out not to be correct. Even when the phase aberration is corrected, the transmission spectrum exhibits the same asymmetry as before for the edge channel. Thus, the aberration must be due to amplitude aberration.

The amplitude aberration may be corrected by tuning the input/output waveguide 18 to a position that reduces the amplitude aberration. By tuning the angles of the input/output waveguides 18, the relative power distribution each input/output waveguide 18 receives from all the arrayed waveguides 14 may be increased, therefore balancing the transmission spectrum of the corresponding channel. In this way, the transmission spectrum of the corrected arrayed waveguide grating 16 may exhibit improved symmetry for the edge channels.

Thus, in an exemplary example shown in FIG. 2, the input or output waveguides 18 do not point to the center of the Rowland circle 22, but rather to the stigmatic point 32 that is displaced relative to the center of the circle 22. In this example, the stigmatic point 32 is outside the Rowland circle 22. Of course, the exact point at which the waveguides 18 should be directed is subject to considerable tunability in specific cases. In other words, the alignment of the waveguides 18 is tuned to reduce amplitude aberrations, especially of the edge channels.

Figure 3:
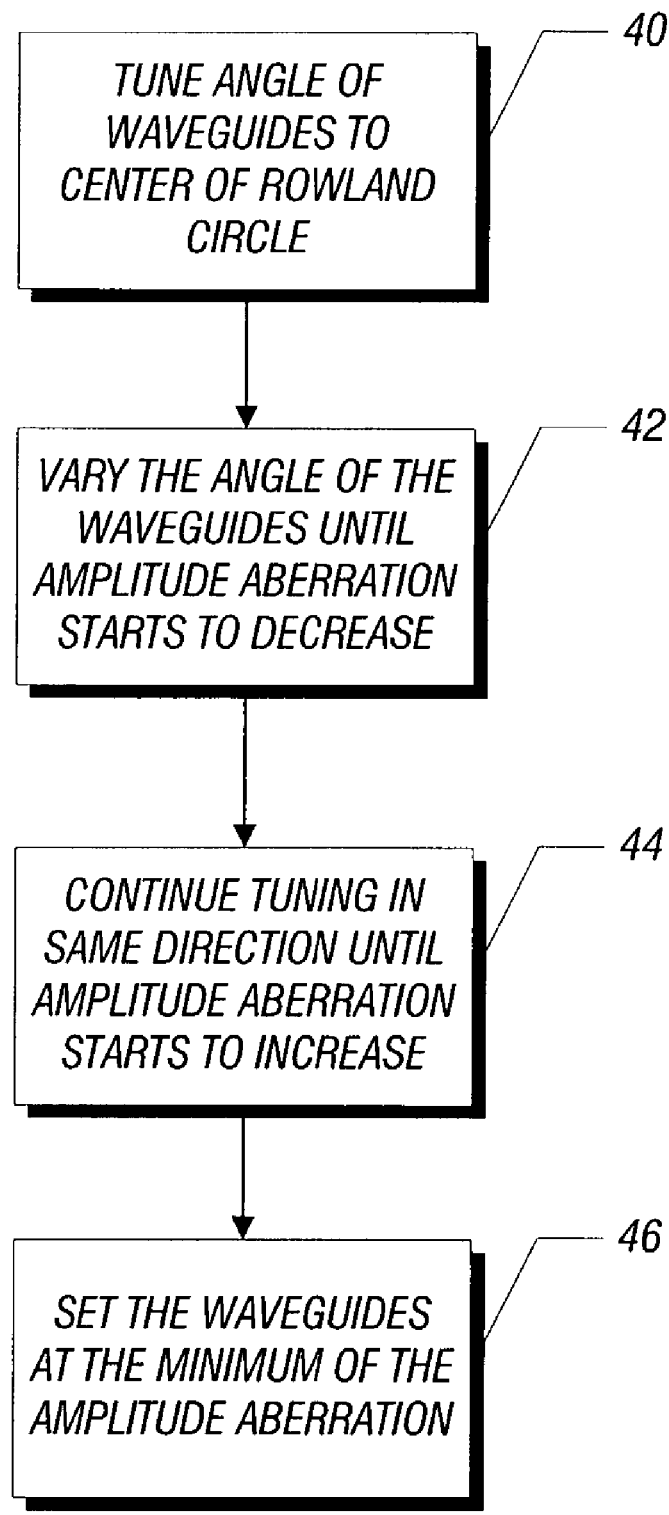
FIG. 3 is a flow chart for designing the gratings shown in FIG. 1 in accordance with one embodiment of the present invention.

Referring to FIG. 3, in one embodiment, the methodology to improve the asymmetry of the edge channels begins by tuning the angle of the input or output waveguides 18 to the center of a Rowland circle as shown in block 40. The waveguide angles may then be varied until the amplitude aberration starts to decrease as indicated in block 42. The tuning may be continued in the same direction until the amplitude aberration starts to increase as indicated in block 44. Then the waveguides 18 may be set at the minimum of the amplitude aberration as indicated in block 46 in one embodiment.

In some embodiments, the location of an optimal point of tuning may be found through numerical simulation. It may be far away from the conventional stigmatic point, and is typically outside of the Rowland circle. With a properly tuned array waveguide grating, with a Gaussian spectrum, aberration correction may reduce adjacent channel crosstalk in some embodiments. For an arrayed waveguide grating with a flat top spectrum, aberration correction produces a ripple in the pass band in some cases. With both kinds of arrayed waveguide grating, aberration correction may improve uniformity of the transmission spectrum and, therefore, reduce the size of the arrayed waveguide grating 16 in some cases.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   tuning an arrayed waveguide grating having input and output waveguides coupled to couplers to reduce amplitude aberration; and
   adjusting the orientations of the input and output waveguides to reduce amplitude aberration.

2. The method of claim 1 including tuning the grating to reduce an amplitude aberration in an edge channel.

3. The method of claim 1 including tuning the grating so that a stigmatic point of at least one of the input or output waveguides is not at the center of a Rowland circle for a coupler.

4. The method of claim 3 including tuning the grating so that a stigmatic point of at least one of an array of waveguides coupled to a coupler is on the Rowland circle.

5. The method of claim 3 including tuning the grating so that the stigmatic point of the at least one of the input or output waveguides is outside of the Rowland circle.

6. A method comprising:
   tuning an arrayed waveguide grating having couplers coupled to input and output waveguides and an array of waveguides so that a stigmatic point of at least one of said input or output waveguides is not at the center of a Rowland circle for a coupler.

7. The method of claim 6 including tuning the grating to reduce the amplitude of aberration.

8. The method of claim 6 including tuning the grating so that the stigmatic point of the at least one input or output waveguide is outside of the Rowland circle for a coupler.

9. The method of claim 8 including tuning the grating to reduce an amplitude aberration in an edge channel.

10. The method of claim 6 including adjusting the orientations of the input and output waveguides to reduce amplitude aberration.

11. An arrayed waveguide grating comprising:
    an input waveguide;
    an output waveguide;
    an array of waveguides coupled to said input and output waveguides;
    a first coupler coupled to said input waveguide and said array of waveguides;
    a second coupler coupled to said array of waveguides and said output waveguide; and
    at least one of said first and second couplers adapted to have a stigmatic point of the input or output waveguides displaced from the center of the Rowland circle for the coupler.

12. The grating of claim 11 including at least two input waveguides and at least two output waveguides.

13. The grating of claim 11 wherein both the first and the second couplers are adapted to have a stigmatic point displaced from the center of the Rowland circle for the coupler.

14. The grating of claim 11 wherein the stigmatic point of an input or an output waveguide is outside of the Rowland circle for its coupler.

* * * * *